(12) United States Patent
Zhang et al.

(10) Patent No.: US 10,152,800 B2
(45) Date of Patent: Dec. 11, 2018

(54) STEREOSCOPIC VISION THREE DIMENSIONAL MEASUREMENT METHOD AND SYSTEM FOR CALCULATING LASER SPECKLE AS TEXTURE

(71) Applicant: ZHUHAI RITECH TECHNOLOGY CO. LTD., Zhuhai, Guangdong (CN)

(72) Inventors: Fugen Zhang, Guangdong (CN); Yunpeng Li, Guangdong (CN)

(73) Assignee: ZHUHAI RITECH TECHNOLOGY CO. LTD., Zhuhai (CN)

( * ) Notice: Subject to any disclaimer, the term of this patent is extended or adjusted under 35 U.S.C. 154(b) by 194 days.

(21) Appl. No.: 15/113,814

(22) PCT Filed: Nov. 25, 2015

(86) PCT No.: PCT/CN2015/095534
§ 371 (c)(1),
(2) Date: Jul. 22, 2016

(87) PCT Pub. No.: WO2016/188068
PCT Pub. Date: Dec. 1, 2016

(65) Prior Publication Data
US 2017/0154436 A1   Jun. 1, 2017

(30) Foreign Application Priority Data

May 27, 2015 (CN) .......................... 2015 1 0280144

(51) Int. Cl.
*G06T 7/40* (2017.01)
*G01B 11/24* (2006.01)
(Continued)

(52) U.S. Cl.
CPC ............... *G06T 7/40* (2013.01); *G01B 11/24* (2013.01); *G01B 11/30* (2013.01); *G06K 9/6202* (2013.01);
(Continued)

(58) Field of Classification Search
CPC . G06T 7/40; G06T 7/593; G06T 2207/10012; G06T 2207/10028;
(Continued)

(56) References Cited

U.S. PATENT DOCUMENTS 6,031,661 A * 2/2000 Tanaami ................ G01B 11/24
356/613

FOREIGN PATENT DOCUMENTS

CN    101608908 A    12/2009
CN    104634276 A *   5/2015

OTHER PUBLICATIONS

International Search Report of PCT Patent Application No. PCT/CN2015/095534 dated Mar. 7, 2016.
(Continued)

*Primary Examiner* — Amandeep Saini

(57) ABSTRACT

The disclosure provides a stereoscopic vision three dimensional measurement method and system calculating a laser speckle as a texture. The measurement method includes that: a forming process of a laser speckle is simulated first, and calculation is performed to obtain a digitized laser speckle diagram, then the laser speckle diagram is outputted onto a film or a photographic dry plate, the laser speckle diagram on the film or the photographic dry plate is projected onto a surface of a measured object subsequently; a left view and a right view of the measured object are acquired finally, and all matching points corresponding to each other are found in the left view and the right view, and then a three dimensional point cloud of the surface of the measured object is reconstructed.

9 Claims, 3 Drawing Sheets

(51) Int. Cl.
  *G01B 11/30* (2006.01)
  *G06K 9/62* (2006.01)
  *G06T 7/593* (2017.01)
  *G06K 9/00* (2006.01)
  *H04N 13/00* (2018.01)

(52) U.S. Cl.
  CPC .......... *G06T 7/593* (2017.01); *G06K 9/00201* (2013.01); *G06K 2209/401* (2013.01); *G06T 2207/10012* (2013.01); *G06T 2207/10028* (2013.01); *H04N 2013/0081* (2013.01)

(58) Field of Classification Search
  CPC ............. H04N 13/0239; G06K 9/6202; G06K 2209/401; G06K 9/00201; G01B 11/30; G01B 11/24
  USPC ........................................................ 382/103
  See application file for complete search history.

(56) References Cited

OTHER PUBLICATIONS

Li, Meiju, Stereo matching based on a speckle-projected stereovision system, Sichuan University, 2005.
Schaffer, M. et al., High-speed pattern projection for three-dimensional shape measurement using laser speckles, Applied optics, Jun. 20, 2010, pp. 3622-3629, vol. 49, No. 18.
Bradski, G. et al., Learning OpenCV: Computer vision with the OpenCV library, 2008, O'Reilly Media, Inc.

* cited by examiner

STEREOSCOPIC VISION THREE DIMENSIONAL MEASUREMENT METHOD AND SYSTEM FOR CALCULATING LASER SPECKLE AS TEXTURE

TECHNICAL FIELD

The disclosure relates to the technical field of three dimensional digital imaging, three dimensional reconstruction, and three dimensional modeling, particularly to a stereoscopic vision three dimensional measurement method and system calculating a laser speckle as a texture.

BACKGROUND

Three dimensional topography measuring has been applied in fields such as industrial detection, preservation of cultural relics, geographical mapping, architectural modeling, reverse engineering, medical plastic, film animation, somatosensory entertainment, virtual reality, and three dimensional printing, wherein is as an important three dimensional measurement method, active light stereoscopic vision has been massively applied in scientific researches and commercial instruments because of its features including quick measurement, simple structure and high precision, and a basic flow includes that: Step 1: a coordinate relation of a left camera and a right camera is marked; Step 2: structural lights are projected onto a surface of a measured object, so as to form a characteristic texture; Step 3: the left camera and the right camera acquire an image respectively so as to obtain a left view and a right view; Step 4: matching points corresponding to each other in the left view and the right view are matched, and the parallax is calculated; Step 5: calculation is performed according to the parallax and the coordinate relation between the left and right cameras, so as to obtain a three dimensional point cloud of the measured object.

SUMMARY

Usually, the accuracy of the final three dimensional point cloud is affected most by the calculation effect of Step 4 in the active light stereoscopic vision three dimensional measurement method while the characteristic texture projected in Step 2 has a large impact on the calculation effect of Step 4; thus each part of an ideal texture should have a unique brightness distribution feature, i.e. texture distribution of a peripheral region of any observation point is different from texture distribution of a peripheral region of any point besides the observation point, so as to ensure that the matching points found in Step 4 are completely accurate.

Li Meiju et al. proposed a stereoscopic matching method of a binocular vision system that uses a commercially available projector to project a digital speckle onto a surface of a measured object as a texture (Literature: Meiju Li, Stereo matching based on a speckle-projected stereovision system [D]. Sichuan University, May, 2005). The "digital speckle" in the method is formed in this way: a screen is divided into sub-images of a certain size (the paper applies a size of 3×3 pixels), a pixel is selected randomly from each sub-image, and a grey scale thereof is set as 255 (the brightest), and the grey scales of the remaining pixels are set as zero. It is no doubt that the speckle produced by such a method has a certain randomness, but it can be hardly ensured that any region has a unique texture characteristic. If the size of a matching window is 3×3 pixels, then the mismatching probability (referred as "an error matching rate" for short) is as high as ⅕. Of course, the error matching rate is will decrease as the matching window increases. However, mismatching cannot be completely eliminated in principle.

SHINING 3D® in Hangzhou proposed a three dimensional digital imaging method combining digital speckle projection and phase measuring profilometry (Reference: Zhou Jin, Zhao Xiaobo. A three dimensional digital imaging method combining digital speckle projection and phase measuring profilometry [P]. Zhejiang: CN101608908, 2009-12-23). In the method, a projector projects a "speckle pattern" to a measured object so as to eliminate the uncertainty of sinusoidal fringe phase matching. A forming method of a speckle and specific parameters are not specified in the method.

Schaffer et al. proposed a method to use a Nd:YAG laser as a coherent light source to irradiate on a scattering screen, and then project scattered lights onto a surface of a measured object by using a lens system to form a laser speckle, so as to perform stereoscopic vision three dimensional measurement (Reference: Schaffer M, Grosse M, Kowarschik R. High-speed pattern projection for three-dimensional shape measurement using laser speckles[J]. Applied optics, 2010, 49(18): 3622-3629). The laser speckle in the method is irradiated onto the rough surface of the object by a laser beam, and lights scattered (transmitted or reflected) by the surface are irradiated onto an observation plane to form a speckle. Since the light intensity on the observation plane is formed by superposition of numberless beams of scattered lights, while any scattered light beam has a random phase, the coherent superposition results in random light intensity at any place on the observation plane. Therefore, the laser speckle may become an ideal binocular parallax three dimensional measurement texture in theory. The power of an applied laser is as high as 200 mW so as to obtain sufficient texture brightness. The method has relatively high cost, the device has a relatively large volume and the system is relatively vulnerable, thus a commercial instruction with a low cost for civil use can be hardly implemented.

In order to solve the problems existing in the traditional art, the disclosure provides a highly reliable ideal laser speckle diagram projection solution with low cost. A laser speckle texture is formed on a surface of a measured object, thus completely avoiding the problem that an existing measurement method can be hardly popularized because a matching point is found incorrectly or cannot be found, or a device has relatively high cost. In addition, the disclosure also provides a is stereoscopic vision three dimensional shape measurement method and system, which has extremely low mismatching probability, strong resistance to interference of ambient lights, quick sampling and low cost, and is easy to popularize.

The disclosure applies the following technical solution to solve the existing technical problems.

A stereoscopic vision three dimensional measurement method calculating a laser speckle as a texture, including that a forming process of a laser speckle is simulated first, and calculation is performed to obtain a digitized laser speckle diagram, then the laser speckle diagram is outputted onto a film or a photographic dry plate, the laser speckle diagram on the film or the photographic dry plate is projected to a surface of a measured object subsequently, a left view and a right view of the measured object are acquired finally, and all matching points corresponding to each other of the surface of the measured object are found in the left view and the right view, and a three dimensional point cloud of the surface of the measured object is reconstructed according to parallax data of the matching points.

Further, that "the calculation is performed to obtain the digitized laser speckle diagram" may include that: scattering of coherent lights by a rough surface is simulated to form a plurality of beams of scattered lights, and the plurality of beams of scattered lights is transmitted onto an observation plane to perform coherent superposition so as to form the laser speckle diagram, wherein a light intensity value of each point on the observation plane is obtained through numerical calculation.

Further, the "numerical calculation" may specifically include that: it is assumed that the amplitudes of lights scattered from any point of the rough surface to a point P of the observation plane are all 1 or a random number, then a formula of the light intensity of the point P of the observation plane is:

$$I(u, v) = \left| \sum_{1}^{n} \sum_{1}^{n} e^{-i\varphi_{i,j}} \right|^2 = I_R(u, v) + I_I(u, v); \text{ where}$$

$$I_R(u, v) = \left( \sum_{1}^{n} \sum_{1}^{n} \cos\varphi_{i,j} \right)^2, I_I(u, v) = \left( \sum_{1}^{n} \sum_{1}^{n} \sin\varphi_{i,j} \right)^2;$$

the $\varphi_{i,j}$ is the phases of lights scattered from a scattering point $(i, j)$ to the point P of the observation plane, and its formula is $$\varphi_{i,j} = \frac{2\pi}{\lambda} \left( \sqrt{(u - x_i)^2 + (v - y_i)^2 + Z_0^2} - 2h_{i,j} \right),$$

the $\sqrt{(u-x_i)^2+(v-y_i)^2+Z_0^2} - h_{i,j}$ is the distance from a scattering point $S(x_i, y_i)$ to the point P $(u, v)$ of the observation plane, the "$h_{i,j}$" is the relative height of a scattering point, i.e. the offset of the height of a certain scattering point from the average height of all scattering points, the $x_i$ and $y_j$ are respectively the coordinates of scattering points numbered $(i, j)$, $$x_i = \frac{L_x}{m}(i - 0.5), y_j = \frac{L_y}{n}(j - 0.5), \text{ and } \frac{L_x}{m} \text{ and } \frac{L_y}{n}$$

therein are the intervals between adjacent transverse scattering points and between adjacent longitudinal scattering points among m×n scattering points at equal intervals on a scattering plane, and the values of m and n are:

$$\begin{cases} m > \frac{L_{px} \cdot L_x}{Z_0 \cdot \lambda} \\ n > \frac{L_{py} \cdot L_y}{Z_0 \cdot \lambda} \end{cases};$$

where $Z_0$ is the distance from the scattering plane to the observation plane, $\lambda$ is the wavelength of a laser, $L_x$ is the length of the scattering plane, $L_y$ is the width of the scattering plane, $L_{px}$ is the length of the receiving plane, $L_{py}$ is the width of the receiving plane; the heights of the scattering points are random numbers independent of each other, and recorded as h(i, j) and the values thereof are generated by a random number generator of a computer, positive and negative values are used, the average value is 0, and the root-mean-square value is larger than or equal to a half of the wavelength;

the autocorrelation lengths $L_{cx}$ and $L_{cy}$, i.e. the size of the speckle, in the x direction and the y direction may be changed by controlling $L_x$, $L_y$, the wavelength $\lambda$ and the distance $Z_0$ between the scattering plane and the observation plane, and the relations among them are:

$$L_{cx} = \frac{\lambda}{L_x} Z_0$$

$$L_{cy} = \frac{\lambda}{L_y} Z_0.$$

Further, the horizontal and vertical autocorrelation lengths $L_{cx}$ and $L_{cy}$ of the speckle may be adjusted according to a shape characteristic of the measured object, a measurement system parameter and an optimal matching precision principle.

Further, that "the left view and the right view of the measured object are acquired, and all matching points corresponding to each other of the surface of the measured object are found in the left view and the right view, and the three dimensional point cloud of the surface of the measured object is reconstructed according to the parallax data of the matching points" may specifically include that: the left view and the right view are aligned first according to the relative positions of a left image acquisition device and a right image acquisition device, wherein the relative positions are determined by a rotation matrix R and a translation vector T; then matching points corresponding to each other in the left view and the right view are searched by using a matching algorithm until all matching points corresponding to each other in the left view and the right view are found, so as to obtain a parallax map between the left view and the right view, finally the parallax map is calculated according to a stereoscopic vision three dimensional reconstructing formula so as to obtain three dimensional point cloud data and complete digital three dimensional imaging; wherein the three dimensional reconstructing formula is:

$$w \begin{bmatrix} X \\ Y \\ Z \\ 1 \end{bmatrix} = Q * \begin{bmatrix} u_l \\ v_l \\ d \\ 1 \end{bmatrix} = \begin{bmatrix} 1 & 0 & 0 & -c_x^{left} \\ 0 & 1 & 0 & -c_y \\ 0 & 0 & 0 & f \\ 0 & 0 & -1/T & (c_x^{left} - c_x^{right})/T \end{bmatrix} * \begin{bmatrix} u_l \\ v_l \\ d \\ 1 \end{bmatrix},$$

where $(u_l, v_l)$ are the coordinates of a certain point on the left view after the left view and the right view are aligned; d is the parallax between the point and a corresponding matching point on the right view, Q is a matrix marked by binocular stereoscopic vision.

Further, that "the matching points corresponding to each other in the left view and the right view are searched by using the matching algorithm" may specifically include that: after line alignment, a point at a location with the smallest Sum of Absolute Difference (SAD) value in the same line is obtained through the following calculation formula by using an SAD matching algorithm when the size of an SAD window is 2 m+1, so as to obtain the position of a matching point;

$$SAD(i, j, d) = \sum_{h=-m}^{m} \sum_{k=-m}^{m} |P_L(i+h, j+k) - P_R(i+h, j+k+d)|;$$

where (i, j) is a point in the left view, d is the parallax between the point and a corresponding matching point on the right view, and $P_L$ and $P_R$ are the grey values on is the current pixels respectively.

Further, the "matching algorithm" in that "the matching points corresponding to each other in the left view and the right view are searched by using the matching algorithm" may be a Sum of Squared Differences (SSD) matching algorithm, a Normalized Cross Correlation (NCC) matching algorithm, or a Zero-mean Normalized Cross-Correlation Algorithm (ZNCC) matching algorithm.

Further, wherein the projection lights in that "the laser speckle diagram on the film or the photographic dry plate is projected to the surface of the measured object" may be incoherent monochromatic lights, and in the meanwhile, ambient lights besides the incoherent monochromatic lights may be stopped by a narrow band filter from being acquired when the left view and the right view of the measured object are acquired.

A stereoscopic vision three dimensional measurement system calculating a laser speckle as a texture, including:

an optical projecting device, mainly configured to project a speckle diagram printed on a film or a photographic dry plate onto a surface of a measured object;

a left camera and a right camera, mainly configured to acquire a left view and a right view of the measured object, respectively;

a computing device, mainly configured to receive and store the left camera and right camera-acquired left view and right view of the measured object, and find all matching points corresponding to each other in the left view and the right view through a certain matching algorithm so as to obtain a parallax map, and then reconstruct a three dimensional point cloud of the measured object through the parallax map.

Further, a light source of the optical projecting device may be incoherent monochromatic lights and light filters may be added in front of imaging lens of the left camera and the right camera.

The disclosure has the following beneficial effect:

the disclosure can project an ideal laser speckle pattern onto a surface of a is measured object with relatively low cost and relatively high reliability through the technical solution above, so as to form a laser speckle texture, thus avoiding the problem in other existing measurement methods that system cost is extremely high, or matching points corresponding to each other are found incorrectly or cannot be found. In addition, a brand new parameter setting method is applied, which can adjust the autocorrelation length of a speckle conveniently so as to obtain a good matching curve. A matching value of the lowest point (or the highest point) of the curve is far smaller (or larger) then the average matching value, thus resulting in extremely low mismatching probability. Incoherent monochromatic lights are applied to illumination while narrow band light filters are added in front of imaging lenses of a left camera and a right camera of a measuring system so as to prevent ambient lights beyond the wavelengths of the monochromatic lights from being received by the cameras, thus enhancing the resistance of the system to interference of the ambient lights. Besides, the system, which has fast sampling, and low cost, is easy to popularize.

DETAILED DESCRIPTION OF THE EMBODIMENTS

The disclosure will be further expounded hereinafter with reference to the accompanying drawings and embodiments so that the purpose, technical solution and advantages of the disclosure are clearer. It should be understood that the specific embodiments described herein are only used for explaining the disclosure, instead of limiting the disclosure.

Figure 3:
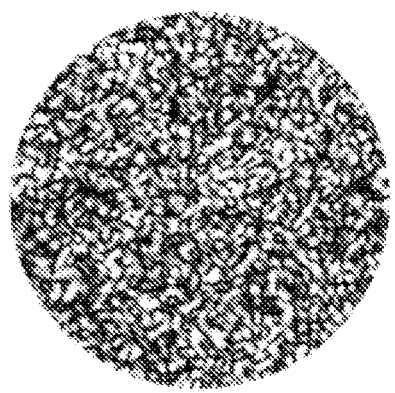
FIG. 3 is a partial diagram of a laser speckle calculation diagram in an embodiment of a stereoscopic vision three dimensional measurement method calculating a laser speckle as a texture according to the disclosure.

As shown in FIG. 1 to FIG. 4:

a stereoscopic vision three dimensional measurement method calculating a laser speckle as a texture according to an embodiment of the disclosure includes that a forming process of a laser speckle is simulated first (by a computer), and calculation is performed to obtain a digitized laser speckle diagram, then the laser speckle diagram is outputted onto a film or a photographic dry plate, the laser speckle diagram on the film or the photographic dry plate is projected to a surface of a measured object subsequently, a left view and a right view of the measured object are acquired finally, and all matching points corresponding to each other of the surface of the measured object are found in the left view and the right view, and a three dimensional point cloud of the surface of the measured object is reconstructed according to parallax data of the matching points, wherein that "the calculation is performed to obtain the digitized laser speckle diagram" includes that: scattering of coherent lights by a rough surface is simulated (by the computer) to form a plurality of beams of scattered lights, and the plurality of beams of scattered lights is transmitted onto an observation plane to perform coherent superposition so as to form the laser speckle diagram, wherein a light intensity value of each point on the observation plane is obtained through numerical calculation (as shown in FIG. 3). The "numerical calculation" specifically includes that: it is assumed that the amplitudes of lights scattered from any point of the rough surface to a point P of the observation plane are all 1 (which may be also a random number), then a formula of the light intensity of the point P of the observation plane is:

$$I(u, v) = \left|\sum_{1}^{n}\sum_{1}^{n} e^{-i\varphi_{i,j}}\right|^2 = I_R(u, v) + I_I(u, v); \text{ where}$$

$$I_R(u, v) = \left(\sum_{1}^{n}\sum_{1}^{n} \cos\varphi_{i,j}\right)^2, I_I(u, v) = \left(\sum_{1}^{n}\sum_{1}^{n} \sin\varphi_{i,j}\right)^2;$$

the $\varphi_{i,j}$ is the phases of lights scattered from a scattering point (i, j) to the point P of the observation plane, and its formula is $$\varphi_{i,j} = \frac{2\pi}{\lambda}\left(\sqrt{(u-x_i)^2 + (v-y_i)^2 + Z_0^2} - 2h_{i,j}\right),$$

the $\sqrt{(u-x_i)^2+(v-y_i)^2+Z_0^2}-h_{i,j}$ is the distance from a scattering point $S(x_i, y_j)$ to the point P(u, v) of the observation plane, the "$h_{i,j}$" is the relative height of a scattering point, i.e. the offset of the height of a certain scattering point from the average height of all scattering points, the $x_i$ and $y_j$ are respectively the coordinates of scattering points numbered (i, j), $$x_i = \frac{L_x}{m}(i - 0.5), y_i = \frac{L_y}{n}(j - 0.5), \text{ and } \frac{L_x}{m} \text{ and } \frac{L_y}{n}$$

therein are the intervals between adjacent transverse scattering points and between adjacent longitudinal scattering points among m×n scattering points at equal intervals on a scattering plane, and the values of m and n are:

$$\begin{cases} m > \frac{L_{px} \cdot L_x}{Z_0 \cdot \lambda} \\ n > \frac{L_{py} \cdot L_y}{Z_0 \cdot \lambda} \end{cases};$$

where $Z_0$ is the distance from the scattering plane to the observation plane, $\lambda$ is the wavelength of a laser, $L_x$ is the length of the scattering plane, $L_y$ is the width of the scattering plane, $L_{px}$ is the length of the receiving plane, $L_{py}$ is the width of the receiving plane; the heights of the scattering points are random numbers independent of each other, and recorded as h(i, j) and the values thereof are generated by a random number generator of a computer, positive and negative values are used, the average value is 0, and the root-mean-square value is equal to $2\lambda/3$.

The autocorrelation lengths $L_{cx}$ and $L_{cy}$, i.e. the size of the speckle, in the x direction and the y direction may be changed by controlling $L_x$, $L_y$, the wavelength $\lambda$ and the distance $Z_0$ between the scattering plane and the observation plane, and the relations among them are:

$$L_{cx} = \frac{\lambda}{L_x} Z_0$$

-continued $$L_{cy} = \frac{\lambda}{L_y} Z_0.$$

That "the left view and the right view of the measured object are acquired, and all matching points corresponding to each other of the surface of the measured object are found in the left view and the right view, and the three dimensional point cloud of the surface of the measured object is reconstructed according to the parallax data of the matching points" specifically includes that: the left view and the right view are aligned first according to the relative positions of a left image acquisition device and a right image acquisition device, wherein the relative positions are determined by a rotation matrix R and a translation vector T; then matching points corresponding to each other in the left view and the right view are searched by using a matching algorithm until all matching points corresponding to each other in the left view and the right view are found, so as to obtain a parallax map between the left view and the right view, finally the parallax map is calculated according to a stereoscopic vision three dimensional reconstructing formula so as to obtain three dimensional point cloud data and complete digital three dimensional imaging, wherein the three dimensional reconstructing formula is:

$$w\begin{bmatrix} X \\ Y \\ Z \\ 1 \end{bmatrix} = Q * \begin{bmatrix} u_l \\ v_l \\ d \\ 1 \end{bmatrix} = \begin{bmatrix} 1 & 0 & 0 & -c_x^{left} \\ 0 & 1 & 0 & -c_y \\ 0 & 0 & 0 & f \\ 0 & 0 & -1/T & (c_x^{left} - c_x^{right})/T \end{bmatrix} * \begin{bmatrix} u_l \\ v_l \\ d \\ 1 \end{bmatrix};$$

where $(u_l, v_l)$ are the coordinates of a certain point on the left view after the left view and the right view are aligned; d is the parallax between the point and a corresponding matching point on the right view, Q is a matrix marked by binocular stereoscopic vision (literature: Bradski G, Kaehler A. Learning OpenCV: Computer vision with the OpenCV library[M]. "O'Reilly Media, Inc.", 2008).

During the process of obtaining the parallax map through the matching, a point at a location with the smallest SAD value in the same line is obtained through the following calculation formula by using an SAD matching algorithm when the size of an SAD window is 2m+1, so as to obtain the position of a matching point:

$$SAD(i, j, d) = \sum_{h=-m}^{m}\sum_{k=-m}^{m} |P_L(i+h, j+k) - P_R(i+h, j+k+d)|;$$

in the formula, (i, j) is a point in the left view, d is the parallax between the point and a corresponding matching point on the right view, and $P_L$ and $P_R$ are the grey values on the current pixels respectively. In addition, the horizontal and vertical autocorrelation lengths $L_{cx}$ and $L_{cy}$ of the speckle may be adjusted according to a shape characteristic of the measured object, a measurement system parameter and an optimal matching precision principle.

Besides, the projection lights in that "the laser speckle diagram on the film or the photographic dry plate is projected to the surface of the measured object" are incoherent monochromatic lights, and in the meanwhile, ambient lights besides the incoherent monochromatic lights are stopped by a narrow band filter from being acquired when the left view and the right view of the measured object are acquired.

Figure 1:
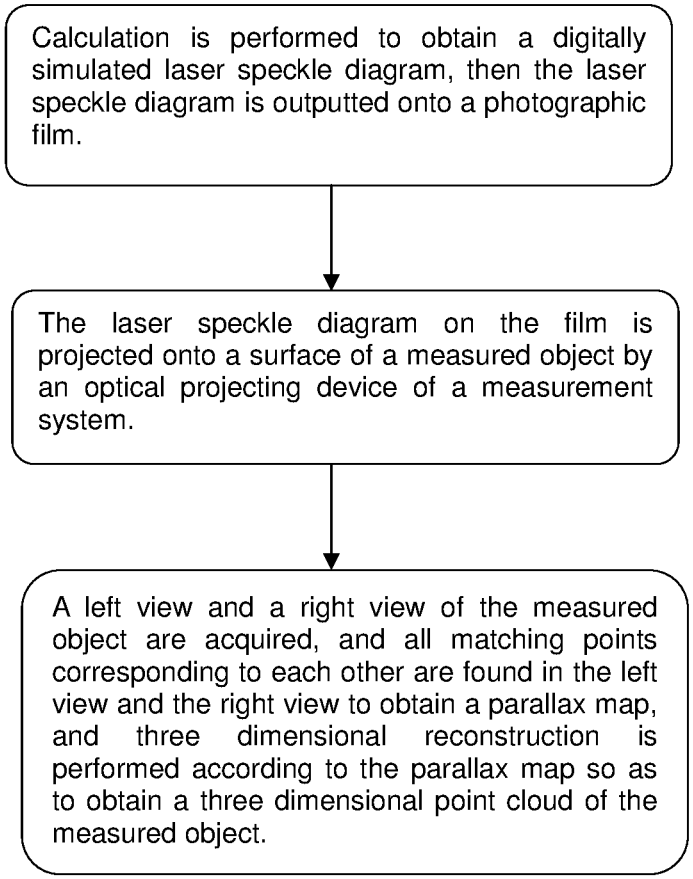
FIG. 1 is a flowchart of a stereoscopic vision three dimensional measurement method calculating a laser speckle as a texture according to an embodiment of the disclosure.
Figure 2:
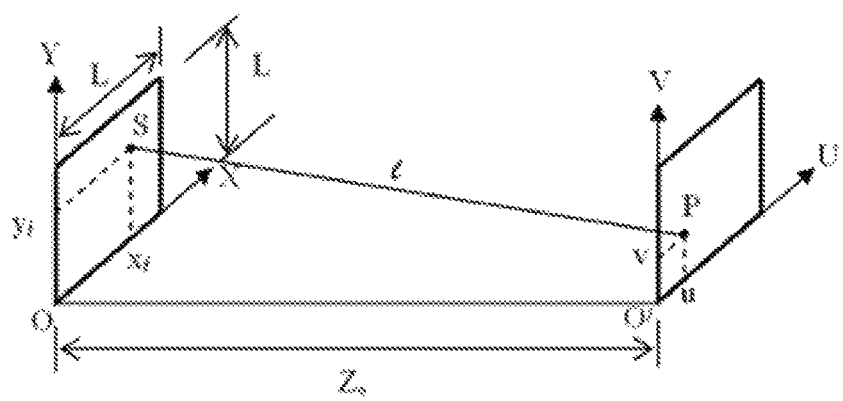
FIG. 2 is a diagram of optical principles of formation of a laser speckle in an embodiment of a stereoscopic vision three dimensional measurement method calculating a laser speckle as a texture according to the disclosure.

For example, as shown in FIG. 2, the length of the rough scattering plane on an XOY plane is Lx, and the width is Ly, the height (x, y) of the surface fluctuates around the XOY plane, and the root-mean-square value of a fluctuation amount is larger than a half of a laser. In other words:

$$\sqrt{\frac{1}{Lx \cdot Ly} \int\int h^2(x, y) dx dy} \geq \frac{\lambda}{2};$$

UOV is the observation plane, and the distance therefrom to the scattering plane is Z0; illumination lights are uniform plane waves vertically entering the scattering plane from right to left, and the phase on the XOY plane is set as 0.

During measurement, parameters in a left camera are:

$$\begin{bmatrix} 2809.6 & 0 & 784.0 \\ 0 & 2807.8 & 615.7 \\ 0 & 0 & 1 \end{bmatrix},$$

and parameters in a right camera are:

$$\begin{bmatrix} 2779.5 & 0 & 806.1 \\ 0 & 2780.9 & 697.8 \\ 0 & 0 & 1 \end{bmatrix},$$

a transformation matrix between the left camera and the right camera is:

$$R = \begin{bmatrix} 0.9419 & -0.0124 & 0.3356 \\ 0.0155 & 0.9999 & -0.0066 \\ -0.3355 & 0.0114 & 0.9420 \end{bmatrix}, T = \begin{bmatrix} -212.4 \\ -2.3 \\ 45.5 \end{bmatrix};$$

Figure 4:
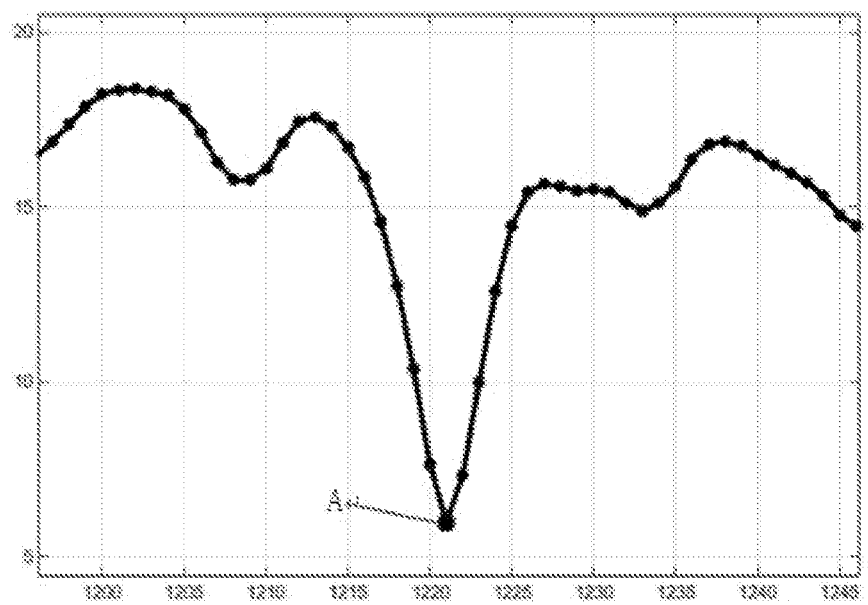
FIG. 4 is a schematic diagram of an SAD curve of a process of searching a corresponding matching point in an embodiment of a stereoscopic vision three dimensional measurement method calculating a laser speckle as a texture according to the disclosure.

After the computer receives the left view and the right view acquired by the left camera and the right camera, lines may be aligned and corrected. The SAD algorithm is used on the left view and the right view with lines aligned, and the corresponding matching points (as shown in FIG. 4) are searched. FIG. 4 is shows a correct corresponding matching point. The point is a point with the smallest SAD value among candidate matching points. The abscissa of the point is the abscissa of a point in the right view, wherein the point corresponds to a point observed in the left view. The parallax diagram between the left view and the right view may be obtained after finding all matching points corresponding to each other in the left view and the right view. According to the parallax map, three dimensional reconstruction is performed to obtain the three dimensional point cloud of the surface of the measured object. The acquisition time is less than 0.1 second and the number of point clouds is smaller than 240 thousands.

In this way, a stereoscopic vision three dimensional measurement method calculating a laser speckle as a texture according to the disclosure may obtain an ideal laser speckle diagram through a numerical calculation method. The speckle diagram is produced into a film, and the laser speckle diagram on the film is further projected onto a surface of a measured object to form a laser speckle texture, thereby completely avoiding the problem in an existing traditional measurement method that matching points corresponding to each other are found incorrectly or cannot be found. In addition, a brand new parameter setting method is applied, which can adjust the autocorrelation length of a speckle conveniently so as to obtain a good matching curve. A matching value of the lowest point (or the highest point) of the curve is far smaller (or larger) then the average matching value, thus resulting in extremely low mismatching probability. In the meanwhile, illumination of incoherent monochromatic lights and a narrow band light filter are applied, so as to prevent ambient lights beyond the wavelengths of the monochromatic lights from being acquired, thus enhancing the resistance to interference of the ambient lights; besides, the disclosure has quick sampling (a left acquisition device and a right acquisition device only need to take a frame of an image respectively at the same time), low cost is and is easy to popularize.

Of course, there may be many "matching algorithms" in that "the matching points corresponding to each other in the left view and the right view are searched by using the matching algorithm", such as an SSD matching algorithm, an NCC matching algorithm, or a ZNCC matching algorithm, and matching algorithms covered by the patent are not limited to the SAD algorithm.

Figure 5:
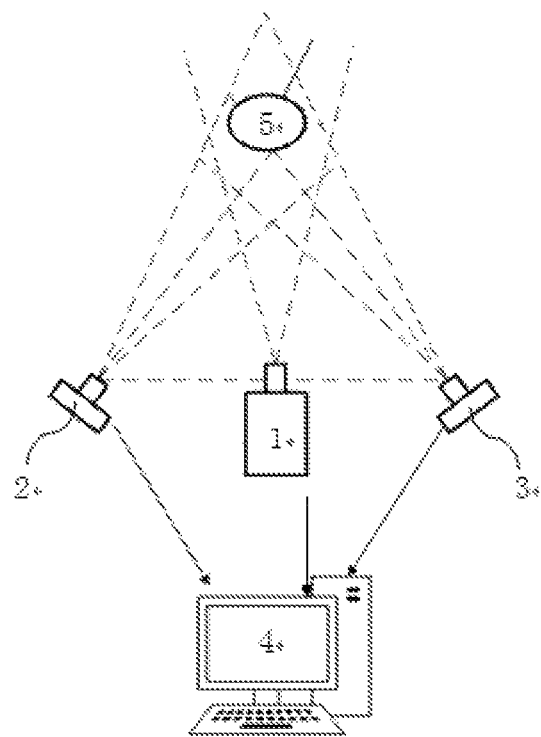
FIG. 5 is a structural diagram of a stereoscopic vision three dimensional measurement system calculating a laser speckle as a texture according to the disclosure.
Figure 6:
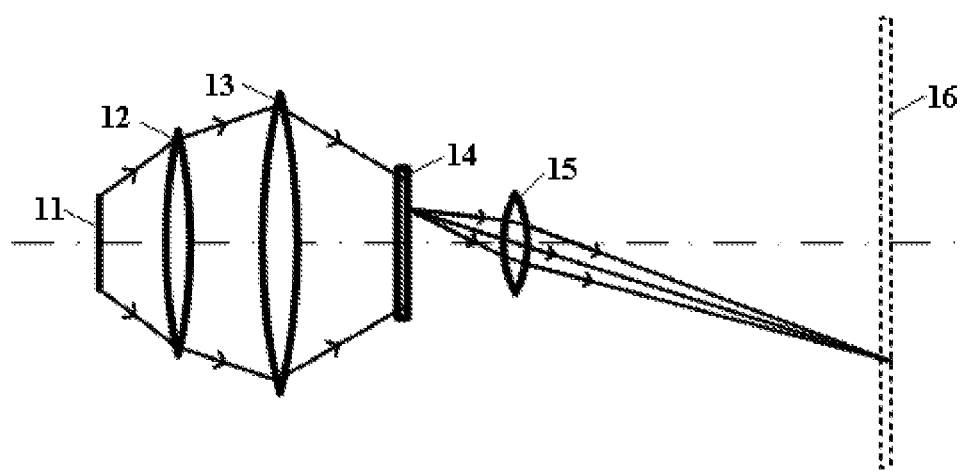
FIG. 6 is a schematic diagram of a projection light path of a stereoscopic vision three dimensional measurement system calculating a laser speckle as a texture according to the disclosure.

As shown in FIG. 5 and FIG. 6:

the disclosure further provides a dedicated measurement system for implementing a stereoscopic vision three dimensional measurement method calculating a laser speckle as a texture, including an optical projecting device 1, a left camera 2, a right camera 3 and a computing device 4, wherein the optical projecting device 1 is mainly configured to project an image on a speckle diagram film onto a surface of a measured object 5; the left camera 2 and the right camera 3 are mainly configured to acquire a left view and a right view of the measured object 5 having the surface projected with the speckle diagram; the computing device 4 is mainly configured to find, through calculation, all points corresponding to each other in the left camera 2 and right camera 3-acquired left view and the right view of the measured object 5, so as to perform three dimensional reconstruction to obtain a three dimensional point cloud of the surface of the measured object 5. The projection direction of the speckle projecting device 1 directly faces the measured object 5, and a light source 11 thereof may be an incoherent monochromatic light source (e.g. a Light Emitting Diode (LED) light source). Light filters may be added in front of imaging lens of the left camera 2 and the right camera 3; and the optical projecting device 1, the left camera 2 and the right camera 3 are interconnected with the computing device 4.

When working, the measurement system of the disclosure first uses the optical projecting device 1 to project the speckle diagram on the film onto the surface of the measured object (specifically, the film 14 is illuminated by the light source 11 through a lens 12 and a lens 13 as shown in FIG. 6), the speckle diagram on the film is projected onto the surface of the measured object through the imaging lenses 15, then the images of the measured object 5 are acquired by the left camera 2 and the right camera 3, and transmitted to the computing device 4, and the computer device 4 finally finds all points corresponding to each other in the left view and the right view by using a matching algorithm (e.g. the SAD algorithm) so as to reconstruct the three dimensional point cloud of the measured object.

In this way, the stereoscopic vision three dimensional measurement system calculating the laser speckle as the texture may ensure relatively low mismatching probability of the matching points, and quick imaging. In addition, incoherent monochromatic lights are used as the light source 11, while the narrow band light filters are added in front of the imaging lenses of the left camera and the right camera of the measurement system, so as to stop ambient lights beyond the wavelengths of the monochromatic lights from being received by the cameras, thus enhancing the resistance of the system to interference of the ambient lights; besides, the system, which has fast sampling, and low cost, is easy to popularize.

The content above is to further describe the disclosure in details with reference to specific preferred technical solutions and it should not be believed that specific implementation of the disclosure is limited to the description. Several simple deductions or replacements may be further made for those skilled in the art without departing from the concept of the disclosure, and should be all considered as belonging to the protection scope of the disclosure.

The invention claimed is:

1. A stereoscopic vision three dimensional measurement method for calculating a laser speckle as a texture, comprising:
   simulating a forming process of a laser speckle first, and performing calculation to obtain a digitized laser speckle diagram;
   then outputting the laser speckle diagram onto a film or a photographic dry plate;
   projecting the laser speckle diagram on the film or the photographic dry plate to a surface of a measured object subsequently;
   acquiring a left view and a right view of the measured object finally, then finding all matching points corresponding to each other of the surface of the measured object in the left view and the right view, and reconstructing a three dimensional point cloud of the surface of the measured object according to parallax data of the matching points;
   wherein the "performing the calculation to obtain the digitized laser speckle diagram" comprises:
   simulating scattering of coherent lights by a rough surface to form a plurality of beams of scattered lights; and
   transmitting the plurality of beams of scattered lights onto an observation plane to perform coherent superposition so as to form the laser speckle diagram;
   wherein a light intensity value of each point on the observation plane is obtained through numerical calculation.

2. The stereoscopic vision three dimensional measurement method for calculating the laser speckle as the texture according to claim 1, wherein the "numerical calculation" comprises: assuming that the amplitudes of lights scattered from any point of the rough surface to a point P of the observation plane are all 1 or a random number, then a formula of the light intensity of the point P of the observation plane is:

$$I(u, v) = \left| \sum_{1}^{n} \sum_{1}^{n} e^{-i\varphi_{i,j}} \right|^2 = I_R(u, v) + I_I(u, v),$$

where $$I_R(u, v) = \left( \sum_{1}^{n} \sum_{1}^{n} \cos\varphi_{i,j} \right)^2, I_I(u, v) = \left( \sum_{1}^{n} \sum_{1}^{n} \sin\varphi_{i,j} \right)^2,$$

the $\varphi_{i,j}$ is the phases of lights scattered from a scattering point (i,j) to the point P of the observation plane, and its formula is $$\varphi_{i,j} = \frac{2\pi}{\lambda} \left( \sqrt{(u-x_i)^2 + (v-y_i)^2 + Z_0^2} - 2h_{i,j} \right),$$

the $\sqrt{(u-x_i)^2+(v-y_i)^2+Z_0^2} - 2h_{i,j}$ is the distance from a scattering point $S(x_i, y_j)$ to the point P (u, v) of the observation plane, the "$h_{i,j}$" is the relative height of a scattering point, i.e. the offset of the height of a certain scattering point from the average height of all scattering points, the $x_i$ and $y_i$ are respectively the coordinates of scattering points numbered (i, j), $$x_i = \frac{L_x}{m}(i-0.5), \ y_i = \frac{L_y}{n}(j-0.5), \ \frac{L_x}{m} \text{ and } \frac{L_y}{n}$$

and therein are the intervals between adjacent transverse scattering points and between adjacent longitudinal scattering points among m×n scattering points at equal intervals on a scattering plane, and the values of m and n are:

$$\begin{cases} m > \dfrac{L_{px} \cdot L_x}{Z_0 \cdot \lambda} \\ n > \dfrac{L_{py} \cdot L_y}{Z_0 \cdot \lambda} \end{cases},$$

where $Z_0$ is the distance from the scattering plane to the observation plane, $\lambda$ is the wavelength of a laser, $L_x$ is the horizontal size of the scattering plane, $L_y$ is the vertical size of the scattering plane, $L_{px}$ is the horizontal size of the observation plane, $L_{py}$ is the vertical size of the observation plane; the heights of the scattering points are random numbers independent of each other, and recorded as h(i, j) and the values thereof are generated by a random number generator of a computer, positive and negative values are used, the average value is 0, and the root-mean-square value is larger than or equal to a half of the wavelength;
the autocorrelation lengths $L_{cx}$ and $L_{cy}$, i.e. the size of the speckle, in the x direction and the y direction may be changed by controlling $L_x$, $L_y$, the wavelength $\lambda$ and the distance $Z_0$ between the scattering plane and the observation plane, and the relations among them are:

$$L_{cx} = \frac{\lambda}{L_x} Z_0,$$

$$L_{cy} = \frac{\lambda}{L_y} Z_0.$$

3. The stereoscopic vision three dimensional measurement method for calculating the laser speckle as the texture according to claim 2, wherein the autocorrelation lengths $L_{cx}$ and $L_{cy}$ of the speckle is adjusted according to a shape characteristic of the measured object, a measurement system parameter and an optimal matching precision principle.

4. The stereoscopic vision three dimensional measurement method for calculating the laser speckle as the texture according to claim 1, wherein the "acquiring the left view and the right view of the measured object, and finding all matching points corresponding to each other of the surface of the measured object in the left view and the right view, and reconstructing the three dimensional point cloud of the surface of the measured object according to the parallax data of the matching points" comprises:

firstly aligning the left view and the right view according to the relative positions of a left image acquisition device and a right image acquisition device, wherein the relative positions are determined by a rotation matrix R and a translation vector T;

then searching matching points corresponding to each other in the left view and the right view by using a matching algorithm until all matching points corresponding to each other in the left view and the right view are found, so as to obtain a parallax map between the left view and the right view;

finally calculating the parallax map according to a stereoscopic vision three dimensional reconstructing formula so as to obtain three dimensional point cloud data and complete digital three dimensional imaging, wherein the three dimensional reconstructing formula is:

$$w\begin{bmatrix}X\\Y\\Z\\1\end{bmatrix} = Q*\begin{bmatrix}u_l\\v_l\\d\\1\end{bmatrix} = \begin{bmatrix}1 & 0 & 0 & -c_x^{left}\\0 & 1 & 0 & -c_y\\0 & 0 & 0 & f\\0 & 0 & -1/T & (c_x^{left}-c_x^{right})/T\end{bmatrix}*\begin{bmatrix}u_l\\v_l\\d\\1\end{bmatrix},$$

where $(u_l, v_l)$ are the coordinates of a certain point on the left view after the left view and the right view are aligned; d is the parallax between the point and a corresponding matching point on the right view, Q is a matrix marked by binocular stereoscopic vision.

5. The stereoscopic vision three dimensional measurement method for calculating the laser speckle as the texture according to claim 4, wherein the "searching the matching points corresponding to each other in the left view and the right view by using the matching algorithm" comprises:

after line alignment, obtaining, through the following calculation formula, a point at a location with the smallest Sum of Absolute Difference (SAD) value in the same line by using an SAD matching algorithm when the size of an SAD window is 2m+1, so as to obtain the position of a matching point:

$$SAD(i, j, d) = \sum_{h=-m}^{m}\sum_{k=-m}^{m}|P_L(i+h, j+k) - P_R(i+h, j+k+d)|,$$

where (i, j) is a point in the left view, d is the parallax between the point and a corresponding matching point on the right view, and $P_L$ and $P_R$ are the grey values on current pixels respectively.

6. The stereoscopic vision three dimensional measurement method for calculating the laser speckle as the texture according to claim 4, wherein the "matching algorithm" in the "searching the matching points corresponding to each other in the left view and the right view by using the matching algorithm" is a Sum of Squared Differences (SSD) matching algorithm, a Normalized Cross Correlation (NCC) matching algorithm, or a Zero-mean Normalized Cross-Correlation Algorithm (ZNCC) matching algorithm.

7. The stereoscopic vision three dimensional measurement method for calculating the laser speckle as the texture according to claim 1, wherein the projection lights in the "projecting the laser speckle diagram on the film or the photographic dry plate to the surface of the measured object" are incoherent monochromatic lights, and in the meanwhile, ambient lights besides the incoherent monochromatic lights are stopped by a filter from being acquired when the left view and the right view of the measured object are acquired.

8. A stereoscopic vision three dimensional measurement system for calculating a laser speckle as a texture, wherein comprises:

an optical projecting device, configured to project a speckle diagram printed on a film or a photographic dry plate onto a surface of a measured object;

a left camera and a right camera, configured to acquire a left view and a right view of the measured object, respectively;

a computing device, configured to receive and store the left camera and right camera-acquired left view and right view of the measured object, and find all matching points corresponding to each other in the left view and the right view through a certain matching algorithm so as to obtain a parallax map, and then reconstruct a three dimensional point cloud of the measured object through the parallax map;

wherein the speckle diagram is obtained by:

simulating scattering of coherent lights by a rough surface to form a plurality of beams of scattered lights; and transmitting the plurality of beams of scattered lights onto an observation plane to perform coherent superposition so as to form the speckle diagram;

wherein a light intensity value of each point on the observation plane is obtained through numerical calculation.

9. The stereoscopic vision three dimensional measurement system for calculating the laser speckle as the texture according to claim 8, wherein a light source of the optical projecting device is incoherent monochromatic lights and light filters are added in front of imaging lens of the left camera and the right camera.

\* \* \* \* \*